(12) United States Patent
Nguyen

(10) Patent No.: US 8,244,124 B2
(45) Date of Patent: Aug. 14, 2012

(54) EYE SAFETY MECHANISM FOR USE IN OPTICAL CABLE WITH ELECTRICAL INTERFACES

(75) Inventor: The-Linh Nguyen, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 1084 days.

(21) Appl. No.: 12/111,854

(22) Filed: Apr. 29, 2008

(65) Prior Publication Data

US 2008/0285980 A1  Nov. 20, 2008

Related U.S. Application Data

(60) Provisional application No. 60/915,086, filed on Apr. 30, 2007.

(51) Int. Cl.
  *H04B 10/00* (2006.01)
  *H04B 10/08* (2006.01)
(52) U.S. Cl. .......... 398/15; 385/88; 385/89; 385/92; 385/79
(58) Field of Classification Search .......... 398/15
  See application file for complete search history.

(56) References Cited

U.S. PATENT DOCUMENTS

| | | |
|---|---|---|
| 3,663,822 A | 5/1972 | Uchida |
| 3,792,284 A | 2/1974 | Kaelin |
| 4,127,862 A | 11/1978 | Ilegems et al. |
| 4,427,879 A | 1/1984 | Becher et al. |
| 4,595,839 A | 6/1986 | Braun et al. |
| 4,736,359 A | 4/1988 | Cohen et al. |
| 4,768,188 A | 8/1988 | Barnhart et al. |
| 4,902,092 A | 2/1990 | Grandy |
| 5,064,299 A | 11/1991 | Hirschmann et al. |
| 5,166,761 A | 11/1992 | Olson et al. |
| 5,303,251 A | 4/1994 | Zelenka |
| 5,337,398 A | 8/1994 | Benzoni et al. |

(Continued)

FOREIGN PATENT DOCUMENTS

CN  200780018055.3  3/2010

(Continued)

OTHER PUBLICATIONS

"DVI and HDMI extension, CAT5 and Fiber Optic Perfect Extenders for your Projector, Plasma, LCD screen or HDTV:" (Web Page; 6 pages) Date of first publication unknown, http://www.ramelectronics.net/html/DVI_fiber_cables.html.

(Continued)

*Primary Examiner* — Danny Leung
(74) *Attorney, Agent, or Firm* — Maschoff Gilmore & Israelsen

(57) ABSTRACT

An eye safety mechanism for use with a bi-directional data cable having an electrical interface at least one (but potentially both) ends, despite the fact that the cable communicates over much of its length using a bi-directional optical channel. Upon power-up, the eye safety mechanism determines whether or not a loss of signal condition is present on an optical receive channel of the bi-directional data cable. If the loss of signal is present, the mechanism intermittently disables the optical transmit channel of the bi-directional data cable. On the other hand, if the loss of signal is not present, the mechanism enables the optical transmit channel of the bi-directional data cable without intermittently disabling transmission at least for most of the time until the next time a loss of signal is detected on the optical receive channel.

20 Claims, 6 Drawing Sheets

U.S. PATENT DOCUMENTS

| | | | |
|---|---|---|---|
| 5,341,086 A | 8/1994 | Fukudome | |
| 5,448,661 A | 9/1995 | Takai et al. | |
| 5,451,767 A | 9/1995 | Amano et al. | |
| 5,497,187 A | 3/1996 | Banker et al. | |
| 5,515,467 A | 5/1996 | Webb | |
| 5,530,787 A | 6/1996 | Arnett | |
| 5,596,665 A | 1/1997 | Kurashima et al. | |
| 5,631,988 A | 5/1997 | Swirhun et al. | |
| 5,668,419 A | 9/1997 | Oktay | |
| 5,732,176 A | 3/1998 | Savage, Jr. | |
| 5,892,784 A | 4/1999 | Tan et al. | |
| 5,907,569 A | 5/1999 | Glance et al. | |
| 5,926,303 A | 7/1999 | Giebel et al. | |
| 6,008,917 A | 12/1999 | Moise et al. | |
| 6,036,654 A | 3/2000 | Quinn et al. | |
| 6,115,516 A | 9/2000 | Watson et al. | |
| 6,179,627 B1 | 1/2001 | Daly et al. | |
| 6,217,231 B1 | 4/2001 | Mesaki et al. | |
| 6,220,873 B1 | 4/2001 | Samela et al. | |
| 6,267,606 B1 | 7/2001 | Poplawski et al. | |
| 6,302,596 B1 | 10/2001 | Cohen et al. | |
| 6,318,909 B1 | 11/2001 | Giboney et al. | |
| 6,441,955 B1 | 8/2002 | Takatsu et al. | |
| 6,446,867 B1 | 9/2002 | Sanchez | |
| 6,454,470 B1 | 9/2002 | Dwarkin et al. | |
| 6,458,619 B1 | 10/2002 | Irissou | |
| 6,461,059 B2 | 10/2002 | Ando et al. | |
| 6,469,906 B1 | 10/2002 | Baltz et al. | |
| 6,478,625 B2 | 11/2002 | Tolmie et al. | |
| 6,485,322 B1 | 11/2002 | Branch et al. | |
| 6,502,997 B1 | 1/2003 | Lee et al. | |
| 6,515,308 B1 | 2/2003 | Kneissi et al. | |
| 6,539,147 B1 | 3/2003 | Mahony | |
| 6,540,412 B2 | 4/2003 | Yonemura et al. | |
| 6,551,117 B2 | 4/2003 | Poplawski et al. | |
| 6,553,166 B1 | 4/2003 | Caldwell | |
| 6,580,739 B1 | 6/2003 | Coldren | |
| 6,588,942 B1 | 7/2003 | Weld et al. | |
| 6,607,307 B2 | 8/2003 | Gilliland et al. | |
| 6,632,030 B2 | 10/2003 | Jiang et al. | |
| 6,717,972 B2 | 4/2004 | Steinle et al. | |
| 6,755,575 B2 | 6/2004 | Kronlund | |
| 6,758,693 B2 | 7/2004 | Inagaki et al. | |
| 6,774,348 B2 | 8/2004 | Tatum et al. | |
| 6,793,539 B1 | 9/2004 | Lee et al. | |
| 6,806,114 B1 | 10/2004 | Lo | |
| 6,817,890 B1 | 11/2004 | Schindler | |
| 6,819,568 B2 | 11/2004 | Cao | |
| 6,822,987 B2 | 11/2004 | Diaz et al. | |
| 6,836,493 B2 | 12/2004 | Mahowald et al. | |
| 6,851,867 B2 | 2/2005 | Pang et al. | |
| 6,905,257 B2 | 6/2005 | Eichenberger et al. | |
| 6,912,361 B2 * | 6/2005 | Aronson et al. | 398/135 |
| 6,914,637 B1 | 7/2005 | Wolf et al. | |
| 6,920,161 B2 | 7/2005 | Riaziat et al. | |
| 6,941,395 B1 | 9/2005 | Galang et al. | |
| 6,952,395 B1 | 10/2005 | Manoharan et al. | |
| 6,954,592 B2 | 10/2005 | Tan et al. | |
| 6,965,722 B1 | 11/2005 | Nguyen | |
| 7,062,171 B2 | 6/2006 | Ota et al. | |
| 7,065,604 B2 | 6/2006 | Konda et al. | |
| 7,070,425 B2 | 7/2006 | Regen et al. | |
| 7,088,518 B2 | 8/2006 | Tatum et al. | |
| 7,092,630 B2 * | 8/2006 | Cunningham et al. | 398/15 |
| 7,153,039 B2 | 12/2006 | McGarvey et al. | |
| 7,154,921 B2 | 12/2006 | Kitamura et al. | |
| 7,162,130 B2 | 1/2007 | Castellani et al. | |
| 7,170,097 B2 | 1/2007 | Edmond et al. | |
| 7,179,329 B2 | 2/2007 | Boone et al. | |
| 7,215,889 B2 | 5/2007 | Light | |
| 7,217,022 B2 | 5/2007 | Ruffin | |
| 7,269,194 B2 | 9/2007 | Diaz et al. | |
| 7,269,673 B2 | 9/2007 | Kim et al. | |
| 7,277,620 B2 | 10/2007 | Vongseng et al. | |
| 7,294,868 B2 | 11/2007 | Debray et al. | |
| 7,309,173 B2 | 12/2007 | Epitaux et al. | |
| 7,327,959 B2 | 2/2008 | Pelletier et al. | |
| 7,347,632 B2 | 3/2008 | Farr | |
| 7,350,984 B1 | 4/2008 | Togami et al. | |
| 7,371,014 B2 | 5/2008 | Willis et al. | |
| 7,373,069 B2 | 5/2008 | Lazo | |
| 7,401,985 B2 | 7/2008 | Aronson et al. | |
| 7,445,389 B2 | 11/2008 | Aronson | |
| 7,496,161 B2 | 2/2009 | Chou et al. | |
| 7,499,616 B2 | 3/2009 | Aronson et al. | |
| 7,548,675 B2 | 6/2009 | Tatum et al. | |
| 7,706,692 B2 | 4/2010 | Tatum et al. | |
| 7,712,976 B2 | 5/2010 | Aronson et al. | |
| 7,729,618 B2 | 6/2010 | Tatum et al. | |
| 7,762,727 B2 | 7/2010 | Aroson et al. | |
| 7,778,510 B2 | 8/2010 | Aronson et al. | |
| 7,860,398 B2 | 12/2010 | Tatum et al. | |
| 7,876,989 B2 | 1/2011 | Aronson et al. | |
| 8,083,417 B2 | 12/2011 | Aronson et al. | |
| 2001/0035994 A1 | 11/2001 | Agazzi et al. | |
| 2002/0006251 A1 | 1/2002 | Kim et al. | |
| 2002/0018609 A1 | 2/2002 | Schumann | |
| 2002/0044746 A1 | 4/2002 | Kronlund et al. | |
| 2002/0049879 A1 | 4/2002 | Eyer | |
| 2002/0063935 A1 | 5/2002 | Price et al. | |
| 2002/0076157 A1 | 6/2002 | Kropp | |
| 2002/0101898 A1 | 8/2002 | Lo et al. | |
| 2002/0114590 A1 | 8/2002 | Eichenberger et al. | |
| 2002/0136510 A1 | 9/2002 | Heinz et al. | |
| 2002/0149821 A1 | 10/2002 | Aronson et al. | |
| 2002/0159725 A1 | 10/2002 | Bucklen | |
| 2002/0160656 A1 | 10/2002 | Nishita | |
| 2002/0177362 A1 | 11/2002 | Chang | |
| 2002/0186243 A1 | 12/2002 | Ellis et al. | |
| 2003/0016920 A1 | 1/2003 | Sohmura et al. | |
| 2003/0021580 A1 | 1/2003 | Matthews | |
| 2003/0034963 A1 | 2/2003 | Moon et al. | |
| 2003/0045160 A1 | 3/2003 | Chen | |
| 2003/0117960 A1 | 6/2003 | Quinlan et al. | |
| 2003/0145258 A1 | 7/2003 | Warner et al. | |
| 2003/0198445 A1 | 10/2003 | Inujima et al. | |
| 2003/0208779 A1 | 11/2003 | Green et al. | |
| 2003/0214807 A1 | 11/2003 | Liu | |
| 2003/0223756 A1 | 12/2003 | Tatum et al. | |
| 2004/0008996 A1 | 1/2004 | Aronson et al. | |
| 2004/0076119 A1 | 4/2004 | Aronson et al. | |
| 2004/0126067 A1 | 7/2004 | Yao et al. | |
| 2004/0141695 A1 | 7/2004 | Miller et al. | |
| 2004/0153854 A1 | 8/2004 | Agrawal et al. | |
| 2004/0158873 A1 | 8/2004 | Pasqualino | |
| 2004/0175079 A1 | 9/2004 | Goto | |
| 2004/0184746 A1 | 9/2004 | Chang | |
| 2004/0208207 A1 | 10/2004 | Kasper et al. | |
| 2004/0208600 A1 | 10/2004 | Guenter et al. | |
| 2004/0252560 A1 | 12/2004 | Hsieh | |
| 2004/0263941 A1 | 12/2004 | Chen et al. | |
| 2004/0264879 A1 | 12/2004 | McColloch et al. | |
| 2005/0031347 A1 | 2/2005 | Soto et al. | |
| 2005/0036746 A1 | 2/2005 | Scheibenreif et al. | |
| 2005/0053340 A1 | 3/2005 | Toriumi et al. | |
| 2005/0063440 A1 | 3/2005 | Deppe | |
| 2005/0063707 A1 | 3/2005 | Imai | |
| 2005/0063711 A1 | 3/2005 | Rossi et al. | |
| 2005/0074990 A1 | 4/2005 | Shearman et al. | |
| 2005/0078916 A1 | 4/2005 | Hosking | |
| 2005/0105910 A1 | 5/2005 | Light | |
| 2005/0105913 A1 | 5/2005 | Ozeki et al. | |
| 2005/0105915 A1 | 5/2005 | Light | |
| 2005/0168957 A1 | 8/2005 | Kawauchi et al. | |
| 2005/0180700 A1 | 8/2005 | Farr | |
| 2005/0232555 A1 | 10/2005 | Rosenberg | |
| 2005/0238358 A1 | 10/2005 | Light | |
| 2005/0249477 A1 | 11/2005 | Parrish | |
| 2005/0286593 A1 | 12/2005 | Guenter | |
| 2005/0286893 A1 | 12/2005 | Horiuchi | |
| 2006/0008276 A1 | 1/2006 | Sakai et al. | |
| 2006/0025018 A1 | 2/2006 | Dube et al. | |
| 2006/0026348 A1 | 2/2006 | Wallace et al. | |
| 2006/0036788 A1 | 2/2006 | Galang et al. | |
| 2006/0045425 A1 | 3/2006 | Kanie et al. | |
| 2006/0045437 A1 | 3/2006 | Tatum et al. | |
| 2006/0045526 A1 | 3/2006 | Katayama et al. | |

| | | | |
|---|---|---|---|
| 2006/0049936 | A1 | 3/2006 | Collins et al. |
| 2006/0067690 | A1 | 3/2006 | Tatum et al. |
| 2006/0077778 | A1 | 4/2006 | Tatum et al. |
| 2006/0083518 | A1 | 4/2006 | Lee et al. |
| 2006/0088251 | A1 | 4/2006 | Wang et al. |
| 2006/0093280 | A1 | 5/2006 | McColloch et al. |
| 2006/0142744 | A1 | 6/2006 | Boutoussov |
| 2006/0164115 | A1 | 7/2006 | Komiya et al. |
| 2006/0203830 | A1 | 9/2006 | Doi |
| 2006/0222300 | A1 | 10/2006 | Frenzel et al. |
| 2007/0058976 | A1 | 3/2007 | Tatum et al. |
| 2007/0122086 | A1 | 5/2007 | Lin |
| 2007/0224884 | A1 | 9/2007 | Engel et al. |
| 2007/0233906 | A1 | 10/2007 | Tatum et al. |
| 2007/0237471 | A1* | 10/2007 | Aronson et al. ............... 385/101 |
| 2007/0291938 | A1 | 12/2007 | Rao et al. |
| 2008/0013896 | A1 | 1/2008 | Salzberg et al. |

FOREIGN PATENT DOCUMENTS

| | | |
|---|---|---|
| CN | 200780018055.3 | 9/2010 |
| GB | 0820337.4 | 2/2009 |
| JP | 07-210644 | 8/1995 |
| JP | 08-008818 | 1/1996 |
| JP | 8130508 | 5/1996 |
| JP | 09-162811 | 6/1997 |
| JP | 2000241642 | 9/2000 |
| JP | 2002208896 | 7/2002 |
| JP | 2002-366340 | 12/2002 |
| JP | 2003-163639 | 6/2003 |
| JP | 2003249711 | 9/2003 |
| JP | 2003-332667 | 11/2003 |
| JP | 2004200847 | 7/2004 |
| JP | 2004213949 | 7/2004 |
| JP | 2004241361 | 8/2004 |
| WO | 03063309 | 7/2003 |
| WO | 2004054139 | 6/2004 |
| WO | PCT/US2006/034110 | 7/2007 |
| WO | PCT/US2007/066655 | 2/2008 |
| WO | PCT/US2006/036093 | 3/2008 |
| WO | PCT/US2007/78658 | 3/2008 |
| WO | PCT/US2008/059579 | 8/2008 |

OTHER PUBLICATIONS

"IEC 825-1 Eye Safety Classification of Some Consumer Electronic products," A.C. Boucouvalas, Bournemouth University, School of Electronics, Talbot campus, Fern Barrow, Pole, Dorset, BH12 5BB, U.K. E-mail: tbournemouth.ac.uk, 1996 The Institution of Electrical Engineers, printed and published by the IEE, Savoy Place, London WC2R OBL, UK, (Web page; 6 pages).

"Fiber Optic Infrastructure," © 2000 by Extreme Networks, Inc.

"Optical DVI—HDCP Extension Cable," by Opticis, dated Aug. 27, 2003.

"Sandia Develops Vertical Cavity Surface Emitting Laser that Promises to Reduce Cost of Fiber Optics Connections," Sandia National Laboratories, Jun. 6, 2000, (Web page; 3 pages). http://www.sandia.gove/media/NewsRel/NR2000/laser.htm.

Caruso, Jeff; "Bandwidth Boom: Making the Connection, Can Fiber Break Through the Glass Ceiling?" Jul. 13, 1998 [retrieved on Apr. 25, 2005]. (Web page; 3 pages). http://www.internetweek.com/supp/bandwidth/canfiber.htm.

Digital Visual Interface DVI Revision I.0, Digital Display Working Group, Apr. 2, 1999.

DVI Extender Extend a single link digital DVI display up to 4,950 feet (1,500 meters). Also known as: DVI Optical Extension, DVI-D extender, DVI digital to multimode fiber, optical extender, graphic extension modules, fiber optic digital video extender. (Web Page; 2 pages) Date of first publication unknown. http://www.networktechinc.com/dvi-optical-extender.html.

Full-Scale Entry of Optical Transmission System Business Begins As Fujifilm Introduces Optical Dvi Link System That Utilizes Lumistar, A Graded Index Plastic Optical Fiber—Realizes World's First 30m-Class High-Speed Opitcal Linking of Digital Images Using a Plastic Optical Fiber; Sep. 8, 2004, (Web Page; 3 pages) http://www.fujifilm.com/news/n040908.html.

High-Definition Multimedia Interface Specification Version 1.1, HDMI Licensing, LLC. May 20, 2004.

High-Definition Multimedia Interface Specification Version 1.2, HDMI Licensing, LLC. Aug. 22, 2005.

Inova Semiconductors, Application Note, GigaStar Digital Display Link, Interfacing Between GigaSTaR DDL and DVI/LVDS, Revision 1.0, 10 pages.

Joiner, Steve; Open Fiber Control for Parallel Optics, Communication Semiconductor Solutions Division, Mar. 27, 1997, 13, USA.

Kanellos, Michael; "Intel Connects Chips With Optical Fiber" Feb. 27, 2004 [retrieved on Apr. 26, 2005]. (Web page; 5 pages). http://news.zdnet.com/2100-9574_22-5166883.html.

Kanellos, Michael; "Intel Gets Optical With Fibre" Mar. 1, 2004 [retrieved on Apr. 26, 2005]. (Web page; 2 pages). http://news.zdnet.co.uk/0,39020330,39147918,00.htm.

Optical DVI (Digital Visual Interface) Link System (Picture Image, 1 page) First date of publication unknown.

Opticis, M1-1PO DVI—HDCP Extension Cable, Stretch your Digital Visual Interface Experience, Version 1.03 Aug. 2003, www.opticis.com, 2 pages.

Opticis; "Optical DV1 Extension Module" © 2005 [retrieved on Apr. 25, 2005]. (Web page; 2 pages). http://www.opticis.com/products_2.htm.

Fiedler et al., "A 1.0625 Gbps Transceiver with 2x-Oversampling and Transmit Signal Pre-Emphasis," ISSCC97/Session 15/ Serial Data Communication/ Paper FP 15.1.

U.S. Appl. No. 11/009,208, Oct. 26, 2007, Notice of Allowance.
U.S. Appl. No. 11/009,208, Oct. 1, 2007, Office Action.
U.S. Appl. No. 11/009,208, Apr. 3, 2007, Final Office Action.
U.S. Appl. No. 11/009,208, Jul. 26, 2006, Office Action.
U.S. Appl. No. 11/009,208, Feb. 14, 2006, Office Action.
U.S. Appl. No. 11/468,280, Jan. 12, 2010, Notice of Allowance.
U.S. Appl. No. 11/468,280, Jun. 3, 2009, Office Action.
U.S. Appl. No. 11/468,280, Oct. 20, 2008, Office Action.
U.S. Appl. No. 11/468,280, Jul. 28, 2008, Office Action.
U.S. Appl. No. 11/468,280, Mar. 20, 2008, Final Office Action.
U.S. Appl. No. 11/468,280, Sep. 11, 2007, Office Action.
U.S. Appl. No. 11/402,106, Oct. 20, 2008, Notice of Allowance.
U.S. Appl. No. 11/402,106, Apr. 29, 2008, Office Action.
U.S. Appl. No. 11/402,106, Dec. 28, 2007, Final Office Action.
U.S. Appl. No. 11/402,106, May 7, 2007, Final Office Action.
U.S. Appl. No. 11/402,106, Sep. 21, 2006, Office Action.
U.S. Appl. No. 11/402,186, Apr. 5, 2010, Notice of Allowance.
U.S. Appl. No. 11/402,186, Aug. 13, 2009, Office Action.
U.S. Appl. No. 11/402,186, Jul. 3, 2007, Final Office Action.
U.S. Appl. No. 11/402,186, Oct. 10, 2006, Office Action.
U.S. Appl. No. 11/198,606, Dec. 7, 2009, Notice of Allowance.
U.S. Appl. No. 11/198,606, Nov. 23, 2009, Office Action.
U.S. Appl. No. 11/198,606, Feb. 24, 2009, Office Action.
U.S. Appl. No. 11/198,606, Jul. 9, 2008, Final Office Action.
U.S. Appl. No. 11/198,606, Dec. 31, 2007, Office Action.
U.S. Appl. No. 11/470,623, Apr. 26, 2010, Notice of Allowance.
U.S. Appl. No. 11/470,623, Jan. 11, 2010, Notice of Allowance.
U.S. Appl. No. 11/470,623, Apr. 17, 2009, Office Action.
U.S. Appl. No. 11/470,623, Sep. 9, 2008, Final Office Action.
U.S. Appl. No. 11/470,623, Feb. 19, 2008, Office Action.
U.S. Appl. No. 11/470,623, Aug. 19, 2010, Notice of Allowance.
U.S. Appl. No. 11/401,803, Jun. 30, 2008, Notice of Allowance.
U.S. Appl. No. 11/401,803, Apr. 3, 2008, Notice of Allowance.
U.S. Appl. No. 11/401,803, Aug. 24, 2007, Office Action.
U.S. Appl. No. 11/401,803, Jul. 11, 2007, Office Action.
U.S. Appl. No. 11/401,802, May 20, 2010, Notice of Allowance.
U.S. Appl. No. 11/401,802, Nov. 30, 2009, Office Action.
U.S. Appl. No. 11/401,802, Feb. 3, 2009, Office Action.
U.S. Appl. No. 11/401,802, Jul. 30, 2008, Panel Decision.
U.S. Appl. No. 11/401,802, Mar. 20, 2008, Final Office Action.
U.S. Appl. No. 11/401,802, Nov. 1, 2007, Restriction Requirement.
U.S. Appl. No. 11/401,802, Apr. 17, 2007, Office Action.
U.S. Appl. No. 11/402,241, Dec. 29, 2009, Office Action.
U.S. Appl. No. 11/402,241, Mar. 25, 2008, Office Action.
U.S. Appl. No. 11/402,241, Apr. 17, 2007, Office Action.
U.S. Appl. No. 11/402,241, Nov. 1, 2007, Restriction Requirement.
U.S. Appl. No. 11/402,241, May 29, 2009, Final Office Action.

U.S. Appl. No. 11/402,241, Jul. 9, 2010, Final Office Action.
U.S. Appl. No. 11/402,169, Apr. 1, 2010, Notice of Allowance.
U.S. Appl. No. 11/402,169, Feb. 16, 2010, Notice of Allowance.
U.S. Appl. No. 11/402,169, Dec. 23, 2009, Notice of Allowance.
U.S. Appl. No. 11/402,169, Feb. 10, 2009, Office Action.
U.S. Appl. No. 11/402,169, Feb. 21, 2008, Final Office Action.
U.S. Appl. No. 11/402,169, Jun. 29, 2007, Office Action.
U.S. Appl. No. 11/402,161, Mar. 14, 2008, Notice of Allowance.
U.S. Appl. No. 11/402,161, Sep. 11, 2007, Office Action.
U.S. Appl. No. 11/402,161, May 31, 2007, Office Action.
U.S. Appl. No. 11/198,619, Apr. 13, 2009, Notice of Allowance.
U.S. Appl. No. 11/198,619, Dec. 17, 2008, Office Action.
U.S. Appl. No. 11/198,619, Apr. 18, 2008, Office Action.
U.S. Appl. No. 11/198,619, Nov. 16, 2007, Office Action.
U.S. Appl. No. 11/198,619, May 4, 2007, Office Action.
U.S. Appl. No. 11/198,619, Oct. 11, 2006, Office Action.
U.S. Appl. No. 12/262,872, Nov. 30, 2009, Office Action.
U.S. Appl. No. 12/262,872, Aug. 13, 2009, Restriction Requirement.
U.S. Appl. No. 12/262,872, Aug. 24, 2009, Interview Summary.
U.S. Appl. No. 12/262,872, Mar. 29, 2010, Notice of Allowance.
U.S. Appl. No. 12/098,343, Nov. 8, 2010, Office Action.
U.S. Appl. No. 12/098,343, Feb. 10, 2011, Final Office Action.
U.S. Appl. No. 11/402,241, Dec. 17, 2010, Office Action.
U.S. Appl. No. 12/111,854, Apr. 28, 2011, Office Action.
X2-MSA, A Cooperation Agreement for a Small Verstatile 10 Gigabit Transceiver Package, Issue 0.9, Jul. 31, 2002. p. 14.
"SANblade: 2-Gbps Fibre Channel to PCI Express Host Bus Adapters", copyright 2003 by Qlogic Corporation.
U.S. Appl. No. 12/979,243, May 12, 2011, Office Action.
U.S. Appl. No. 12/979,243, Oct. 24, 2011, Office Action.
U.S. Appl. No. 11/402,241, Aug. 23, 2011, Notice of Allowance.
U.S. Appl. No. 10/829,608, Dec. 29, 2006, Notice of Allowance.
U.S. Appl. No. 10/829,608, May 17, 2006, Office Action.
U.S. Appl. No. 10/829,608, Oct. 5, 2005, Office Action.
U.S. Appl. No. 10/829,608, Feb. 15, 2005, Office Action.

* cited by examiner

EYE SAFETY MECHANISM FOR USE IN OPTICAL CABLE WITH ELECTRICAL INTERFACES

CROSS-REFERENCE TO RELATED APPLICATIONS

This application claims the benefit of U.S. provisional patent application Ser. No. 60/915,086 filed Apr. 30, 2007, which provisional patent application is incorporated herein by reference in its entirety.

BACKGROUND

Many high speed data transmission networks rely on optical links to communicate digital data. For each direction of such an optical link, the link includes an optical transmitter (such as a laser), an optical fiber, and an optical receiver (such as a photodiode). For proper optical coupling of the optical transmitter to the optical fiber, the optical transmitter is often included as part of a "transmit optical sub-assembly" or "TOSA". For proper optical coupling of the optical receiver to the optical fiber, the optical receiver is often included as part of a "receive optical sub-assembly" or "ROSA". The optical transmitter converts outgoing electrical data signals into outgoing optical data signals which are coupled into the optical fiber. The optical receiver receives optical signals from the optical fiber and converts incoming optical data signals into incoming electrical signals.

In normal operation, the optical signals are confined within the optical link, being substantially contained within the optical fiber, the transmit optical sub-assembly and the receive optical sub-assembly. Accordingly, the optical signals are not typically emitted into the environment. However, there are realistic scenarios in which the optical link can fail to the point where optical signals are leaked into the environment. For instance, the optical fiber might be severed, or may become unplugged at either end of the optical link. In that situation, if the leaked optical signal were to be received into the human eye, harm might result. Accordingly, various standards have been proliferated in order to guard against harm to the human eye when signals are propagated optically.

Typically, such safeguards take the form of keeping optical signals below a certain optical threshold for given time periods. The lower levels of optical power unfortunately tend to make faster optical power transmission rates much more difficult to achieve. Accordingly, there remains a need in the art to permit optical transmission at higher data rates while retaining safeguards protecting against harm to the human eye should optical leaking occur.

BRIEF SUMMARY

Although not required, embodiments of the present invention relate to an eye safety mechanism for use with a bi-directional data cable having an electrical interface at least one (but potentially both) ends, despite the fact that the cable communicates over much of its length using a bi-directional optical channel. Upon power-up, the eye safety mechanism determines whether or not a loss of signal condition is present on an optical receive channel of the bi-directional data cable. If the loss of signal is present, the mechanism intermittently disables the optical transmit channel of the bi-directional data cable. On the other hand, if the loss of signal is not present, the mechanism enables the optical transmit channel of the bi-directional data cable without intermittently disabling transmission at least for most of the time until the next time a loss of signal is detected on the optical receive channel. The eye safety mechanism may be included within the cable itself, as a separate mechanism, or within a host computing system couplable to the cable. If the cable has an electrical interface at both ends, such an eye safety mechanism may be incorporated for addressing eye safety at both sides of the transmission.

Accordingly, optical transmission only occurs intermittently during the period of time when a loss of signal is detected on the receive channel. This intermittent transmission causes the average optical transmission power to be reduced when a loss of signal is present at the receive channel. Since a loss of signal is indicative that there is higher potential for leakage of optical power into the environment, this average reduced optical transmission power reduces or eliminates the risk of harm due to, for example, eye exposure to the leaked optical signals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The appended drawings are used in order to more particularly describe embodiments of the present invention. Understanding that these drawings depict only typical embodiments of the invention and are not therefore to be considered to be limiting of its scope, the embodiments will be described and explained with additional specificity and detail through the use of the accompanying drawings in which.

DETAILED DESCRIPTION OF THE PREFERRED EMBODIMENTS

Embodiments of the present invention relate to an eye safety mechanism for use with a bi-directional data cable having an electrical interface at least one (but potentially both) ends, despite the fact that the cable communicates over much of its length using a bi-directional optical channel.

Upon power-up, the eye safety mechanism determines whether or not a loss of signal condition is present on an optical receive channel of the bi-directional data cable. If the loss of signal is present on the receive channel, then the transmit channel is permitted to transmit only intermittently to thereby reduce average optical transmit power. On the other hand, if the loss of signal is not present on the receive channel, the transmit channel is fully enabled, thereby permitting higher optical transmission powers.

If the loss of signal is present on the receive channel, then there is a higher chance that the cable is severed or disconnected, thereby potentially causing optical power to leak into the ambient environment. If the optical power is too high, this could cause harm to observing eyes in the ambient environment. However, the eye safety mechanism only intermittently transmits if a loss of signal is present, thereby reducing the average optical transmission power, and reducing or eliminating eye safety hazards. On the other hand, if a loss of signal is not present on the receive channel, an eye safety hazard is not present, and thus higher optical transmission powers may be used. This higher level of optical transmission power during normal operation allows for greater transmission speeds.

A bi-directional data cable having an electrical interface at both ends and communicating over much of its length optically will first be described with respect to FIG. 1. Then, a data cable having an electrical interface at only one end and communicating over much of its length optically will be described with respect to FIG. 2. Then, the eye safety mechanism will be described with respect to FIGS. 3 through 7.

Figure 1:
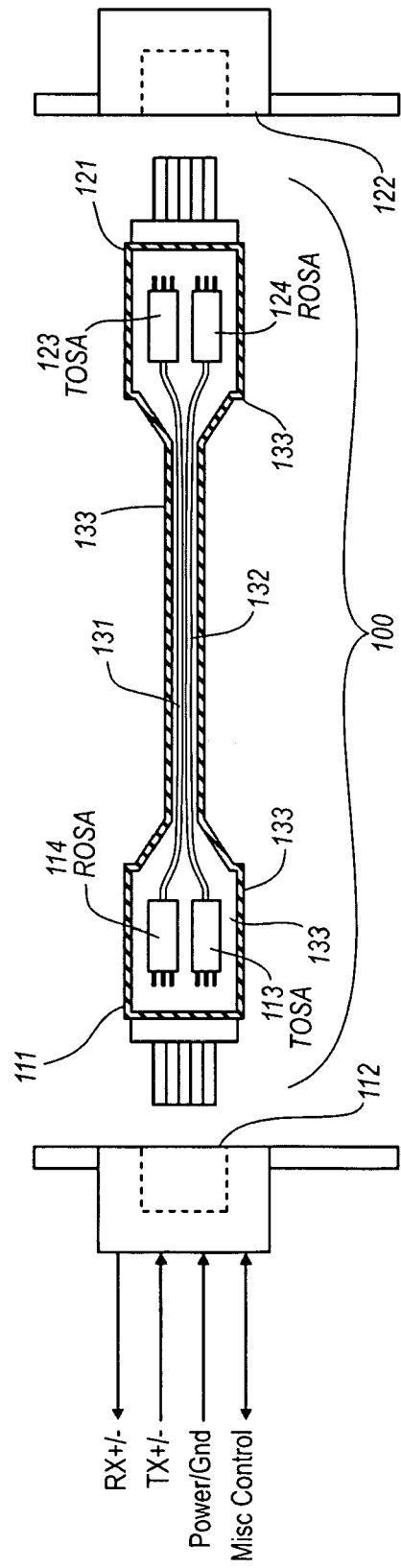
FIG. 1 illustrates a fully duplex electrical-to-electrical cable.

FIG. 1 illustrates a bi-directional data cable 100 that has electrical connections 111 and 121 at both ends. The data cable 100 of FIG. 1 is just one example of a data cable that may be used in embodiments of the present invention. The specific features of the data cable 100 should thus not be construed as being required elements of the invention.

Each electrical connection is sized and configured to connect to a corresponding electrical port at each network node. Thus, the electrical connection is one example of an electrical interface for the data cable. For example, electrical connector 111 is configured to connect to electrical port 112 at one network node, while the electrical connector 121 is configured to connect to the electrical port 122 at the other network node. Each electrical connector may have a number of control pins. For example, In FIG. 1, the electrical port 112 transmits and receives the actual transmit and receive data, but may also supply power (and ground), and may provide and receive electrical miscellaneous control signals. The right electrical port 122 may have similar electrical connections. From the external connection viewpoint, it is as though the cable is entirely an electrical cable.

However, upon closer examination of the cable 100 of FIG. 1, communication over at least part of the cable length is actually accomplished via optical fibers. Each end of the cable 100 has optics that support duplex-mode optical communications. Specifically, the optics at each end of the cable 100 include a transmit channel and a receive channel. The transmit channel includes a transmit optical sub-assembly (TOSA) that optically couples an optical signal from an optical transmitter into one optical fiber. The receive channel includes a receive optical sub-assembly (ROSA) for receipt of an optical signal from another optical fiber into an optical receiver. Integrated circuits to drive the transmitting optics and to receive the detected signal are included. These ICs may be outside the TOSA or ROSA or may be integrated directly in their design.

Referring in further detail to FIG. 1, the cable 100 includes two optical fibers 131 and 132 integrated within the cable 100. When an electrical signal is applied to the appropriate connections of the electrical connector 121 (e.g., through the electrical port 122), those electrical signals are converted by a laser driver and TOSA 123 (or more specifically by an electro-optical transducer within the TOSA 123) to a corresponding optical signal. As noted, the laser driver may be included within the TOSA. The optical signal is transmitted over optical fiber 131 to ROSA 114. The ROSA 114 (or more specifically, an opto-electronic transducer within the ROSA 114) converts the optical signal received from the optical fiber 131 into a corresponding electrical signal. Typically the optical transducer would consist of a PIN detector and a preamplifier Integrated Circuit (IC), usually with a transimpedance amplifier front-end design. A limiting amplifier may also be integrated with the preamplifier or provided separately. The electrical signal is applied on the appropriate connections of the electrical connector 111, whereupon it is provided to the electrical port 112. While the cable 100 may be of any length, in one embodiment, the length is from 1 to 100 meters. The cable may support high speed communication range between 1 to 10 gigabits per second and beyond.

To facilitate bi-directional communication, when an electrical signal is applied to the appropriate connections of the electrical connector 111 (e.g., through the electrical port 112), those electrical signals are converted by a laser driver and TOSA 113 (or more specifically by an electro-optical transducer within the TOSA 113) to a corresponding optical signal. Once again, the laser driver may (but need not) be integrated within the TOSA. The optical signal is transmitted over optical fiber 132 to ROSA 124. The ROSA 124 (or more specifically, an opto-electronic transducer within the ROSA 124) converts the optical signal received from the optical fiber 132 into a corresponding electrical signal. The electrical signal is applied on the appropriate connections of the electrical connector 121, whereupon it is provided to the electrical port 122. The cable 100 may additionally include a protective coating or housing 133 which protects the optical fibers, the optics and portions of the electrical connectors. Finally, though not shown in the figure, the fiber optic cable might include some form of strength member such as Kevlar yarn.

A transmit channel (from the viewpoint of the left connector) or a receive channel (from the viewpoint of the right connector) is defined by the electrical transmit pins on the left connector 111, the TOSA 113, the optical fiber 132, the ROSA 124, and electrical receive pins on the right connector 121. An optical transmit channel (from the viewpoint of the left connector) or an optical receive channel (from the viewpoint of the right connector) is included as part of this channel. This optical channel includes the optical components of the TOSA 113, the optical fiber 132, and the optical components of the ROSA 124.

Similarly, a receive channel (from the viewpoint of the left connector) or a transmit channel (from the viewpoint of the right connector) is defined by the electrical transmit pins on the right connector 121, the TOSA 123, the optical fiber 131, the ROSA 114, and electrical receive pins on the left connector 111. An optical receive channel (from the viewpoint of the left connector) or an optical transmit channel (from the viewpoint of the right connector) is included as part of this channel. This optical channel includes the optical components of the TOSA 123, the optical fiber 131, and the optical components of the ROSA 114.

Figure 2:
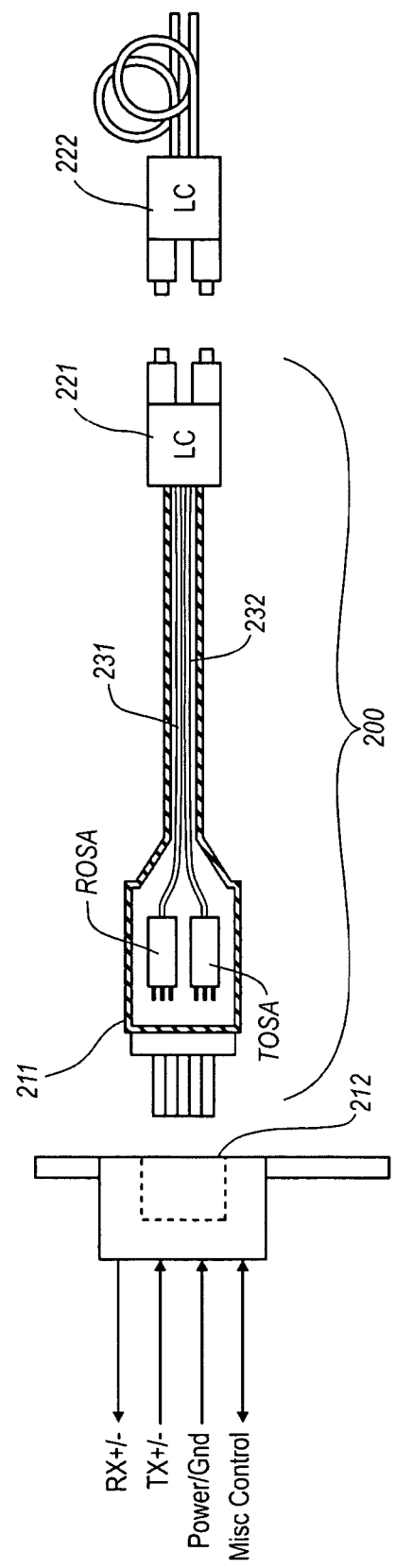
FIG. 2 illustrates a fully duplex electrical-to-optical cable.

FIG. 2 illustrates an integrated cable 200 in accordance with another embodiment of the invention in which the cable 200 may be used as one link in a multiple link connection. The integrated cable 200 of FIG. 2 is similar to the integrated cable 100 of FIG. 1, except that the integrated cable 200 has an electrical connector 211 on only one end of the cable for connection with the electrical port 212, and an optical connector 221 on the other end of the cable. The optical connector 221 is configured to permit the cable to receive optical signals from other optical cables through optical fiber 231 using connectors 221 and 222, and transmit optical signals from optical fiber 232 through the other optical cable also using connectors 221 and 222.

In the illustrated embodiment of FIG. 2, the optical connector 221 is illustrated as a standard LC optical connector (see ANSI/TIA/EIA 604-10. "FOCIS-10 Fiber Optic Connector Intermateability Standard" 10/99 for more information concerning the standard LC optical connector). However, any optical connection may suffice including, but not limited to, SC optical connectors (see IEC61754-4 "Fiber optic connector interface Part 4: Type SC connector family" Ed 1.2, 2002-2003 for more information concern the standard SC optical connector) as well as other optical connections, whether now existing or to be developed in the future. While the cable 200 may be of any length, in one embodiment, the length is from 1 to 5 meters.

The E-O cable 200 could have specifications on the optical input and output such as the minimum and maximum transmitted modulated power and the minimum and maximum acceptable receive power. These could either be custom specifications to enable a particular range of links with given fiber types. Alternatively, the optical interface of this cable could comply with one or more existing or future optical standards for multimode or single mode fiber connections.

One example would be the IEEE 10G BASE-SR standard which allows transmission of up to 300 meters on some grades of multimode optical fiber. The E-O cable 200 may interoperate with existing optical transceivers such as, for example, the SFP (see Small Form-factor Pluggable (SFP) Transceiver Multi-source Agreement (MSA), Sep. 14, 2000. Also, TNF-8074i Specification for SFP (Small Formfactor Pluggable) Transceiver Rev 1.0 May 12, 2001), XFP (see http://www.xfpmsa.org/XFP_SFF_INF_8077i_Rev4_0.pdf), XENPAK (see http://www.xenpak.org/MSA/XENPAK_MSA R3.0.pdf), X2 (see http://www.x2msa.org/X2_MSA_Rev2.0b.pdf) or XPAK transceivers, as long as the cable 200 followed a consistent set of optical specifications suitable for the transceiver type.

Referring for a moment back to FIG. 1, although the cable 100 communicates over much of its length using optical signals, the cable 100 is connected externally using electrical connectors at both end. Thus, the electrical to electrical (E-E) cable 100 illustrated in FIG. 1 does not have to meet any external optical specification. Accordingly, higher optical powers may be used to communicate so long as appropriate eye safety measures are taken. The principles of the present invention provide some measure of eye safety by reducing optical transmit power if there is a loss of signal on the receive channel, thus indicative of a disconnected or severed cable.

Figure 3:
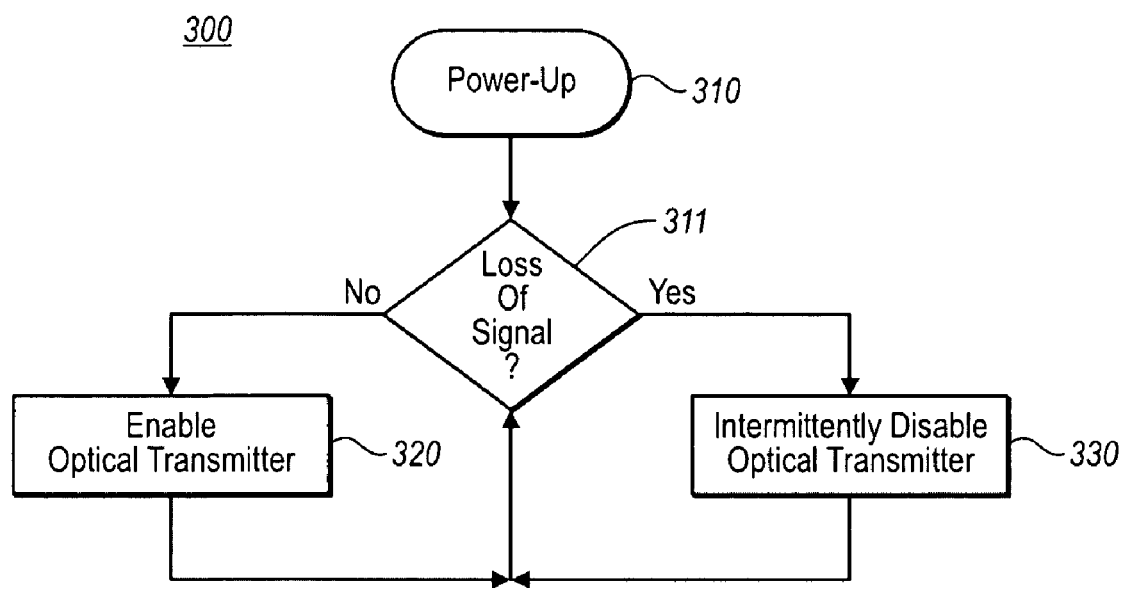
FIG. 3 illustrates a flowchart of a method for implementing eye safety on a cable that communicates over much of its length using optics, but has an electrical interface on one or more sides of the cable.

FIG. 3 illustrates a flowchart of a method 300 for performing eye safety in the context of a cable that communicates over much of its length using optics, but nevertheless has an electrical interface at one or more sides. Examples of such cable are illustrated and described with respect to FIGS. 1 and 2. However, such cables are examples only. If the eye safety mechanism were implemented within the cable 100 of FIG. 1, the eye safety method 300 may (but need not) be performed at each side of the cable 100, left and right. If the eye safety mechanism were implemented within the cable 200 of FIG. 2, the eye safety method 300 may be performed at the left side of the cable. The principles of the present invention may also be implemented in cables that include more than two sides. For any given side of the cable, the method 300 may be performed entirely within the transmit optical subassembly within the cable, within the host attached to the cable, or distributed between the host or the cable.

The method 300 may be initiated at power-up, reset or initialization (collectively referred to as "power-up" in the claims) of the side of the cable (act 310). At power-up, the method 300 may initially make a determination as to whether or not there is a loss of signal detected at the receive optical subassembly at that side of the cable (decision block 320). Such a loss of signal is experienced if there is no signal being received on the receive channel of that side of the cable. There might be a loss of signal if, for example, the transmit optical subassembly on the other side of the cable is not operating properly. There might also be a loss of signal if the cable is severed, of if the cable is unplugged at the other end.

For example, referring to FIG. 1, suppose that the method 300 is being performed at the left side of the cable 100. If the TOSA 123 was not operating properly, the right side 121 of the cable 100 was unplugged, or the optical fiber 131 was severed, the ROSA 114 coupled to the optical fiber 131 might detect a loss of signal. Now suppose the method 300 is being performed at the right side of the cable 100. If the TOSA 113 was not operating properly, the left side 111 of the cable 100 was unplugged, or the optical fiber 132 was severed, the ROSA 124 coupled to the optical fiber 132 might detect a loss of signal. As an additional example, referring to FIG. 2, suppose that the method 300 is being performed at the left side of the cable 200. If the right side 221 of the cable 100 was unplugged, or the optical fiber 231 was severed, the ROSA coupled to the optical fiber 231 might detect a loss of signal.

If there is not a loss of signal (No in decision block 311) on the receive channel, then the optical transmitter is enabled (act 320), thereby being permitted to optically transmit data as the data is electrically acquired from the host at least for most of the time, but preferable for all the time until the next loss of signal is detected on the receive channel. For instance, suppose the method 300 were performed at the left side 111 of the cable 100 of FIG. 1 (which is the primary example discussed hereinafter for purposes of illustration). If the ROSA 114 does not detect a loss of signal, then the TOSA 113 is fully enabled.

On the other hand, if there is a loss of signal (Yes in decision block 311) on the receive channel, then the optical transmitter is intermittently disabled (act 330). For instance, if the ROSA 114 detects a loss of signal, then the TOSA 113 is intermittently disabled.

By intermittently disabling the optical transmitter in the case of a loss of signal on the receive channel, the average optical power emitter by the optical transmitter is reduced. Since a loss of signal on the receive channel increases the chance of a severed or unplugged cable, the optical power is thus reduced in circumstances where an eye safety concern may have arisen.

The optical transmitter is only intermittently disabled. This means also that the optical transmitter is also intermittently enabled. A "disabled" optical transmitter means that the optical transmitter is not capable of transmitting data that is represented by optical high signals. An "enabled" optical transmitter means that the optical transmitter is capable of transmitting optical signals. In one example, the duty cycle of the optical transmitter may be less than fifty percent when intermittently disabled, meaning that the optical transmitter is disabled more than it is enabled. For lower average optical powers, the duty cycle may be even less. For example, the duty cycle of the optical transmitter may be perhaps even less than 20 percent, meaning that the optical transmitter is enabled less than 20 percent of the time at least until the loss of signal is no longer detected. Duty cycles of 10 percent or even lower would further reduce average optical power on the transmit channel during the loss of signal on the receive channel.

Figure 4:
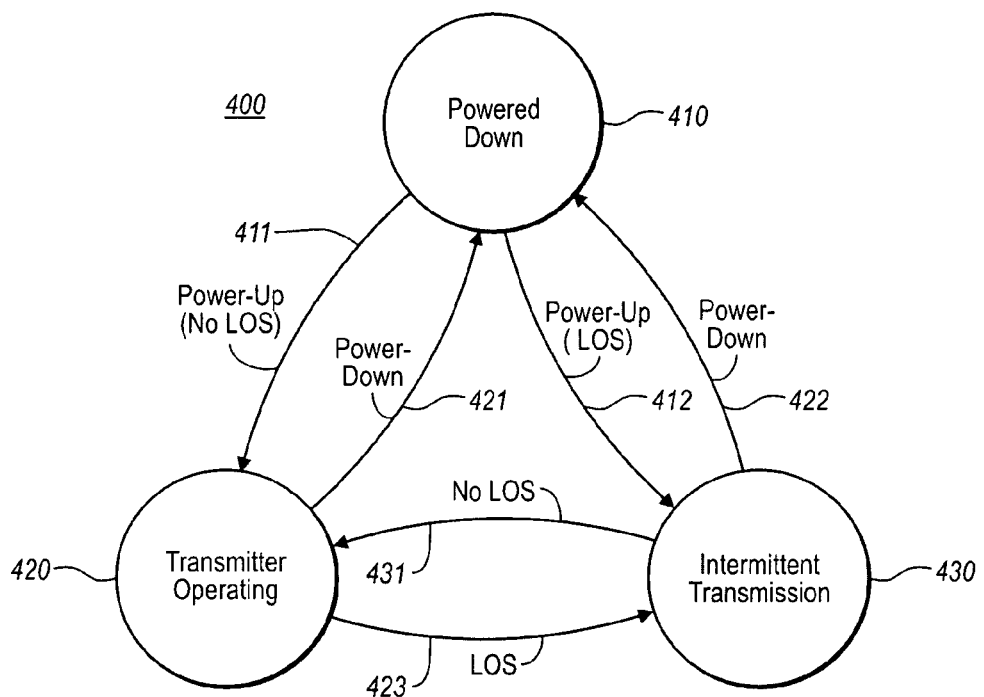
FIG. 4 illustrates a state transition diagram implemented in the method of FIG. 3 that may be performed at the electrical interface(s) of the cable.

FIG. 4 illustrates an example state transition diagram 400 showing an example eye safety process. In this discussion, we will begin with the assumption that the cable end is powered down (state 410). Upon power-up (or reset), the next state will depend on whether there is a loss of signal detected on the receive channel. If there is not a loss of signal, then the state transitions from the powered down state 410 to the transmitting operating state 420 as represented by state transition arrow 411. On the other hand, if there is a loss of signal upon power-up, then the state transitions from the powered down state 410 to the intermittent transmission state 430 as represented by state transition arrow 412.

If in the transmitter operating state 420, if the cable end loses power or is reset, the state transitions from the transmitter operating state 420 to the powered down state 410 (even if only momentarily as is the case in a reset) as represented by state transition arrow 421. If in the transmitter operating state 420, a loss of signal is detected (or a presence of signal is lost), then the state transitions from the transmitter operating state 420 to the intermittent transmission state 430 as represented by state transition arrow 423.

If in the intermittent transmission state 430, if the cable end loses power or is reset, the state transitions from the intermittent transmission state 430 to the powered down state 410 (even if only momentarily as is the case in a reset) as represented by state transition arrow 422. If in the intermittent transmission state 430, a loss of signal is no longer detected (or a presence of signal is detected), then the state transitions from the intermittent transmission state 430 to the transmitter operating state 420 as represented by state transition arrow 431.

Figure 5:
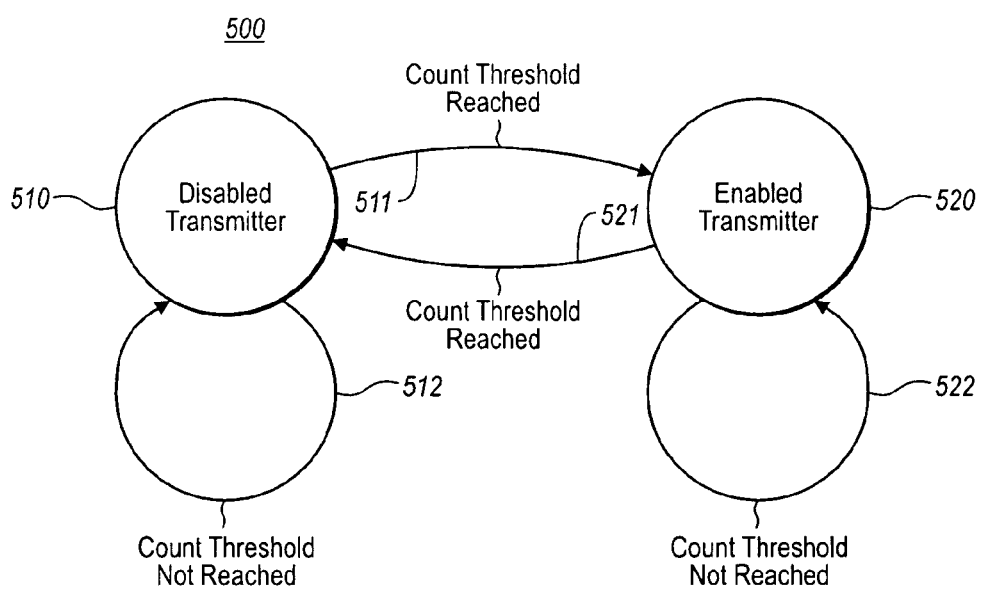
FIG. 5 illustrates a state transition diagram for maintaining the intermittent transmission state of FIG. 4.

FIG. 5 is a state transition diagram 500 showing one embodiment of how the intermittent transmission state 430 of FIG. 4 may be implemented. In this embodiment, the optical transmitter is disabled (state 510) or enabled (state 520). Intermittency may be achieved by using a counter, that causes the state to periodically transition between the transmitter disabled state (state 510) and the transmitter enabled state (state 520). When entering the intermittent transmission state 430, the state 510 or 520 may be entered first.

If in the transmitter disabled state (state 510), and the count does not reach a specific count threshold, then the transmitter disabled state 510 is maintained as represented by arrow 512. If a count threshold is reached, then the state transitions from the transmitter disabled state 510 to the transmitter enabled state 520 as represented by state transition arrow 511.

If in the transmitter enabled state 520, and the count does not reach a specific count threshold, then the transmitter disabled state 520 is maintained as represented by arrow 522. If a count threshold is reached, then the state transitions from the transmitter enabled state 520 to the transmitter disabled state 510 as represented by state transition arrow 521.

Several examples of signal timing diagrams that implement such eye safety measures will now be described with respect to FIGS. 6 and 7. In each of these figures, the cable is assumed to perform the eye safety method 300 of FIG. 3 on both ends. The receive channel signal RX1 represents a loss of signal detection at the receive channel of a first end of the cable. A low RX1 signal means that there has been no loss of signal (a signal is present on the receive channel) detected on the receive channel of the cable at the first end. A high RX1 signal means that there has been a loss of signal detected on the receive channel of the cable at the first end. The RX2 signal represents the loss of signal detection from the viewpoint of the second end of the cable. TX1-Counter and TX2-Counter signals represent transmitter counters for the first and second ends, respectively, of the cable. The TX1-TXDIS signal is high when the transmitter at the first end of the cable is disabled, and is otherwise low. Similarly, the TX2-TXDIS signal is high when the transmitter at the second end of the cable is disabled, and is otherwise low.

The example signal timing diagram 600 of FIG. 6 will first be described. In this example, just prior to time T1, both the first and second ends of the cable are not yet powered up.

At time T1, the first end is powered up, although the second end is still not powered up yet. Since the second end is not powered up, the receive channel at the first end of the cable does not have a signal. Accordingly, the RX1 signal goes high upon power-up. Referring to FIG. 4, the state transitions from the powered down state 410 to the intermittent transmission state 430. The transmission counter signal TX1-Counter is initiated. Referring to FIG. 5, upon entering state 430 of FIG. 4, the initial state is the transmitter disabled state 510. Accordingly, the signal TX1-TXDIS is initially high.

Between times T1 and T2, the counter increments until at time T2, the counter has reached a threshold that causes the state to transition from the transmitter disabled state 510 to the transmitter enabled state 520, causing signal TX1-TXDIS to transition low momentarily. Since we are still in the intermittent transmission state 430, the counter continues.

Between times T2 and T3, the counter increments until at time T3, the counter has reached a threshold that causes the state to transition from the transmitter enabled state 520 back to the transmitter disabled state 510, causing signal TX1-TXDIS to transition high momentarily. This cycle repeats itself until the loss of signal is no longer detected. Accordingly, the optical transmitter is intermittently enabled and disabled while there is a loss of signal. Accordingly, at time T4, the TX1-TXDIS signal transitions low, only to transition high again at time T5.

Just after time T5, at time T6, when the optical transmitter at the first end is still disabled, the second end of the cable is powered-up. Since the power-up of the second end of the cable occurred at a time when the transmitter at the first end of the cable was disabled, the receive optical subassembly at the second end of the cable will soon detect a loss of signal on its receive channel. This is represented by the signal RX2 going high at time T6. The second end of the cable also independently follows the method 300 of FIG. 3 and the state transition diagrams of FIGS. 4 and 5. Accordingly, the state at the second end transitions from powered-down state 410 to intermittent transmission state 430. The transmission counter signal TX2-Counter is thus started also at time T6. In this case as well, upon entering the intermittent transmission state 430, the transmitter disabled state 510 of FIG. 5 is entered.

In this case, the transmitter count of the second end of the cable never reaches the threshold necessary to enable the optical transmitter by transitioning from state 510 to state 520. Instead, at time T7, the optical transmitter at the first end of the optical cable is enabled as part of its intermittent enabling of the optical transmitter.

Due to cable signal propagation delay, at some small time T8 after time T7, the second end of the cable detects the signal transmitted from the first end of the cable. Accordingly, the signal RX2 transitions low, the count TX2-Counter ceases, and the second end of the cable transitions from intermittent transmission state 430, to transmitter operating state 420. Accordingly, the transmission disable signal TX2-TXDIS for the second end of the cable transitions low, and the transmitter at the second end of the optical cable begins transmitting.

After some signal propagation delay at time T9, the signal is received at the first end of the optical cable, causing the loss of signal RX1 of the first end of the cable to transition low. Initialization is thus completed at time T9, with both ends of the cable able to optically communicate with one another. Note that at time T1, the first end of the cable was not receiving a signal from the second end of the optical cable. This might have been due to a severed cable or other eye safety concern. Thus, the intermittent disabling of the optical transmitter is appropriate to reduce average optical power.

At time T10, however, a real eye safety concern arises. Specifically, an optical fiber is cut, that optical fiber being between the optical transmitter at the first end of the cable and the optical receiver at the second end of the cable. The second end of the cable will thus detect a loss of signal, causing signal RX2 to transition high, and causing the counter to begin to facilitate an intermittent transmission state. Accordingly, the TX2-DIS signal intermittently transitions high and low. This will cause both sides to only intermittently transmit.

Figure 6:
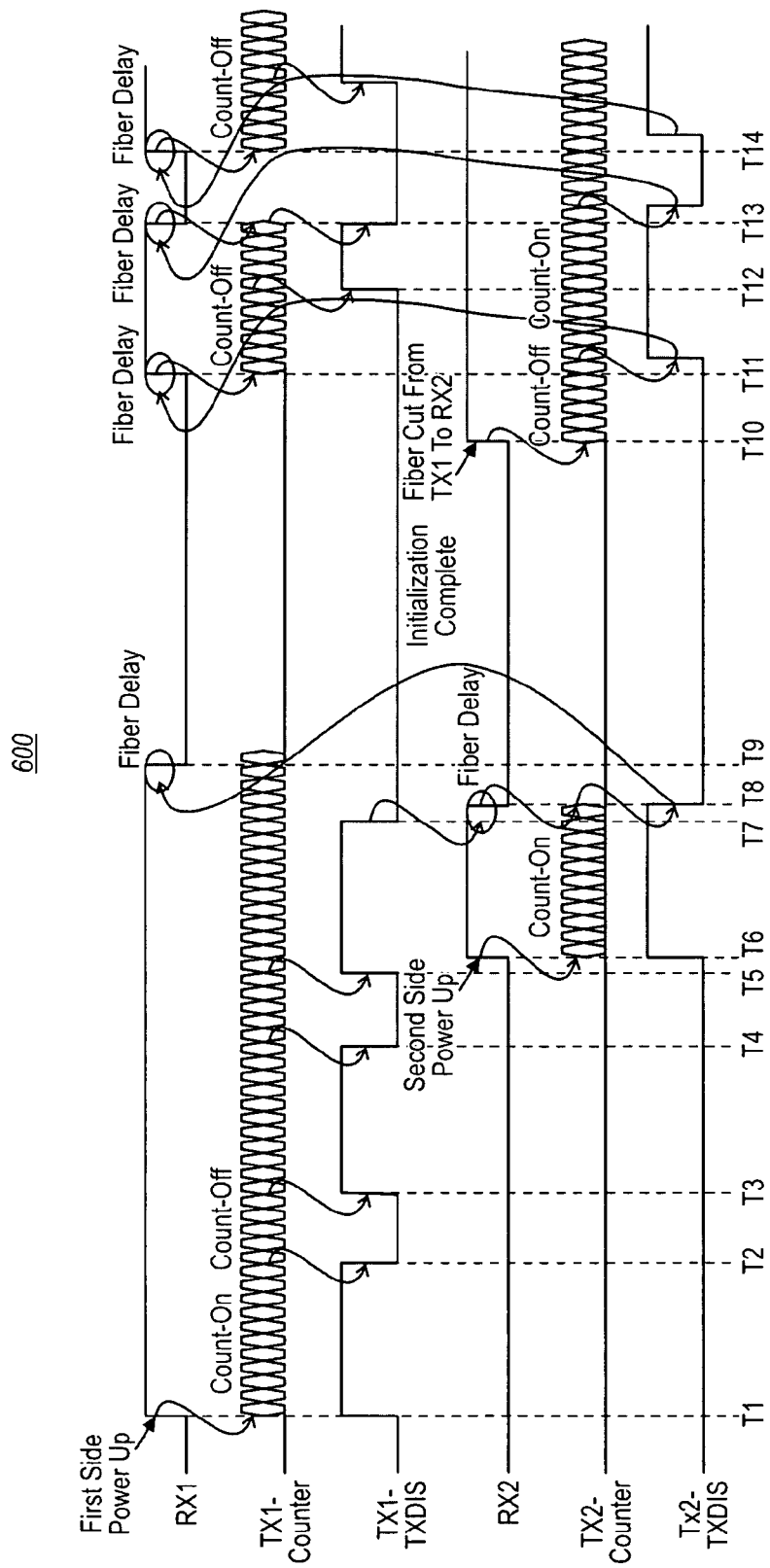
FIG. 6 illustrates a first example signal timing diagram showing an eye safety mechanism.
Figure 7:
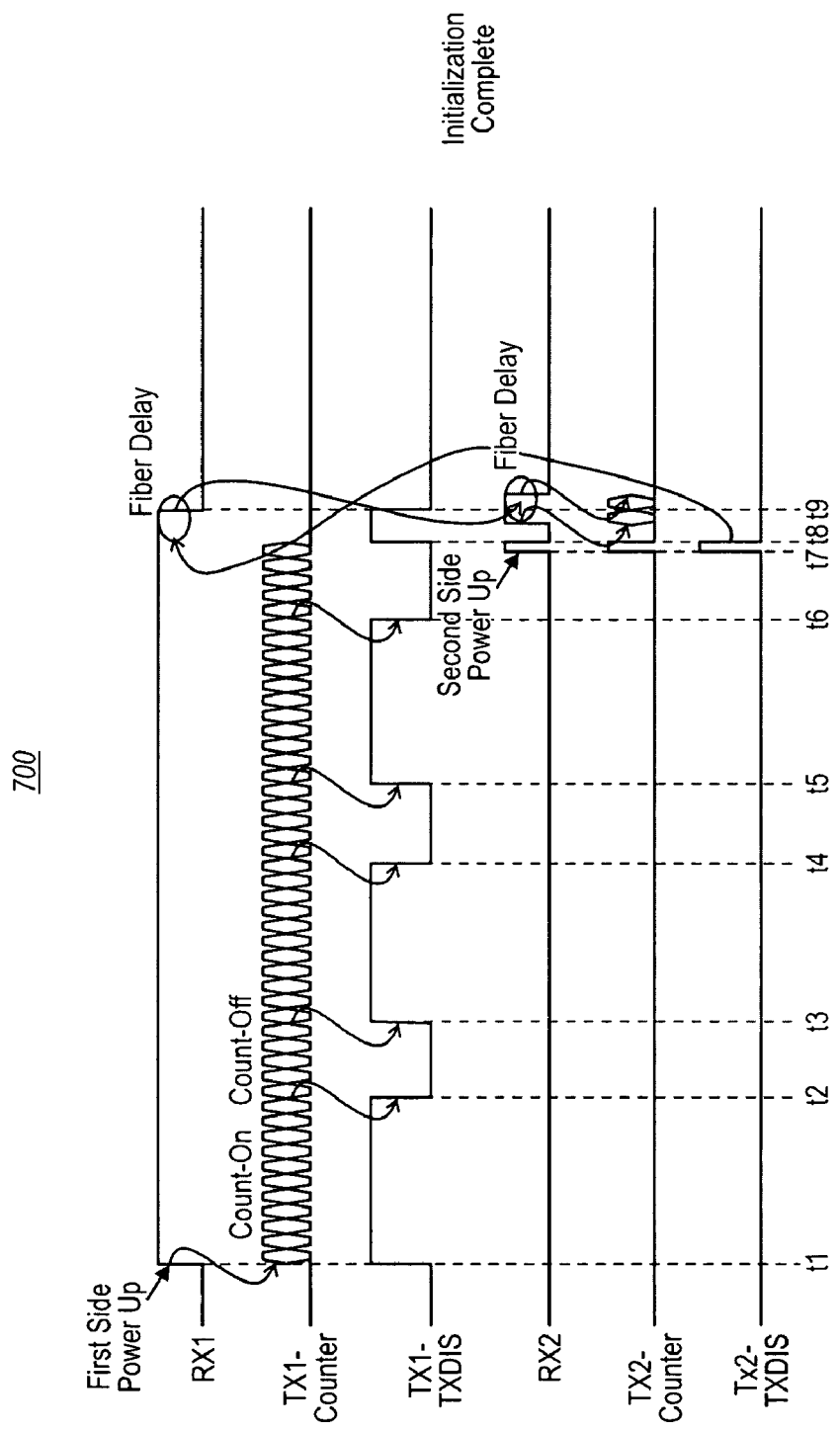
FIG. 7 illustrates a second example signal timing diagram showing an eye safety mechanism.

In the example signal timing diagram 700 of FIG. 7, the situation is initially quite the same as for FIG. 6, except that the intermittent enabling and disabling of the optical transmitter continues through times T1 through T8. Between times T6 and T8, the transmitter at the first end of the cable is not disabled (is enabled). Also between times T6 and T8, at time T7, the second end of the cable is powered-up. This is a little different than the first example of FIG. 6, since the example of FIG. 6 shows the second end of the cable powering up at a time that the transmitter of the first end of the cable was disabled.

Accordingly, the loss of signal at the second end of the cable RX2 is only temporarily high, causing the counter TX2-Counter to only briefly count, and causing the TX2-DIS signal to only briefly be disabled. Once a signal is received from the first transmitter, the RX2 signal goes low, the counting stops, and the transmitter at the second end of the cable is enabled, causing data to be transmitted to the first end of the cable.

At time T8, however, the TX1-DIS signal transitions high as part of the normal course of intermittent transmission. At this stage, the first end of the cable is not aware yet that the second end of the cable is transmitting. Accordingly, at time T8, the loss of signal RX1 is still high. In the meantime, since the first end of the cable has stopped transmitting, the RX2 signal will transition high, the counting will once again begin with signal TX2-Counter, and the second transmitter will be disabled.

However, very shortly, at time T9, the first side of the cable receives the signal transmitted by the second side of the cable, causing signal RX1 to transition low, stopping the counter, and enabling the first transmitter. Accordingly, before very long, this signal is received at the second end, and synchronization is achieved.

Accordingly, an eye safety mechanism is described in which average optical power is reduced if the cable is severed or disconnected. Furthermore, synchronization may be quickly achieved between both cable ends in causes in which the cable is not severed or disconnected.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A bi-directional data cable having an electrical interface at at least a first end, the cable comprising:
    a cable protective housing for the cable;
    a first optical fiber for transmitting optical signals in a first direction from a first end of the cable to a second end of the cable;
    a second optical fiber for transmitting optical signals in a second direction from the second end of the cable to the first end of the cable;
    a transmit optical sub-assembly having an optical transmitter that is optically coupled to the first optical fiber such that when an electrical data signal is received at an electrical interface at the first end of the cable, a corresponding optical data signal is transmitted by the optical transmitter onto the first optical fiber during normal operation; and
    a receive optical sub-assembly having an optical receiver that is optically coupled to the second optical fiber such that when an optical data signal is received at the optical receiver, a corresponding electrical data signal is produced at the electrical interface at the first end of the cable during normal operation,
    wherein the first and second optical fibers, the receive optical sub-assembly and the transmit optical sub-assembly are integrated within the cable protective housing with the electrical interface at the first end of the cable being exposable for connection therewith,
    wherein the transmit optical sub-assembly is configured to perform the following after power-up:
        an act of determining whether or not the receive optical sub-assembly is detecting a loss of signal on the second optical fiber;
        if the loss of signal is detected on the second optical fiber, an act of intermittently disabling the optical transmitter; and
        if the loss of signal is not detected on the second optical fiber, an act of enabling the optical transmitter without intermittently disabling the optical transmitter at least for most of the time until the next time a loss of signal is detected on the second optical fiber.

2. The bi-directional cable in accordance with claim 1, wherein the act of intermittently disabling the optical transmitter comprises:
    an act of operating the optical transmitter such that it is off more than it is on.

3. The bi-directional cable in accordance with claim 2, wherein the act of enabling the optical transmitter comprises:
    an act of operating the optical transmitter such that it is on more than it is off during the entire period of time until the next time a loss of signal is detected on the second optical fiber.

4. The bi-directional cable in accordance with claim 2, wherein the act of enabling the optical transmitter comprises:
    an act of operating the optical transmitter such that it is on during the entire period of time until the next time a loss of signal is detected on the second optical fiber.

5. The bi-directional cable in accordance with claim 1, wherein the act of intermittently disabling the optical transmitter comprises:
    an act of operating the optical transmitter such that it is on less than twenty percent of the time until the loss of signal is no longer detected.

6. The bi-directional cable in accordance with claim 5, wherein the act of enabling the optical transmitter comprises:
    an act of operating the optical transmitter such that it is on more than it is off during the entire period of time until the next time a loss of signal is detected on the second optical fiber.

7. The bi-directional cable in accordance with claim 5, wherein the act of enabling the optical transmitter comprises:
    an act of operating the optical transmitter such that it is on during the entire period of time until the next time a loss of signal is detected on the second optical fiber.

8. The bi-directional cable in accordance with claim 1, wherein the second end of the bi-directional cable comprises an optical interface that is exposable for connection therewith.

9. The bi-directional cable in accordance with claim 1, wherein the second end of the bi-directional cable comprises an electrical interface that is exposable for connection therewith.

10. The bi-directional cable in accordance with claim 1, wherein the transmit optical sub-assembly is a first transmit optical sub-assembly, the optical transmitter is a first optical sub-assembly, the receive optical sub-assembly is a first receive optical sub-assembly, and the optical receiver is a first optical receiver, the cable further comprising the following at the second end of the cable:

a second transmit optical sub-assembly having a second optical transmitter that is optically coupled to the second optical fiber such that when an electrical data signal is received at an electrical interface at the second end of the cable, a corresponding optical data signal is transmitted by the optical transmitter onto the second optical fiber during normal operation; and a second receive optical sub-assembly having a second optical receiver that is optically coupled to the first optical fiber such that when an optical data signal is received at the second optical receiver, a corresponding electrical data signal is produced at the electrical interface at the second end of the cable during normal operation.

11. The bi-directional cable in accordance with claim 10, wherein the second transmit optical sub-assembly is configured to perform the following after power-up:

an act of determining whether or not the second receive optical sub- assembly is detecting a loss of signal on the first optical fiber;

if the loss of signal is detected on the first optical fiber, an act of intermittently disabling the second optical transmitter; and if the loss of signal is not detected on the first optical fiber, an act of enabling the second optical transmitter without intermittently disabling the second optical transmitter at least for most of the time until the next time a loss of signal is detected on the first optical fiber.

12. A host computing system incorporating therein an eye safety mechanism, the host computing system capable of being communicatively coupled to a first electrical interface at a first end of a bi-directional data cable having a receive channel and a transmit channel and having an electrical interface at both ends, the bi-directional data cable having a bi-directional optical channel incorporated therein, wherein the eye safety mechanism is configured to perform the following after the bi-directional data cable is connected to the host computing system:

an act of determining whether or not a loss of signal condition is present on the receive channel of the bi-directional data cable;

if the loss of signal is present, an act of intermittently disabling the transmit channel of the bi-directional data cable; and if the loss of signal is not present, an act of enabling the transmit channel of the bi-directional data cable without intermittently disabling transmission at least for most of the time until the next time a loss of signal is detected on the receive channel, wherein the receive channel and the transmit channel, including the bi-directional optical channel, are integrated within a cable protective housing of the bi-directional data cable with the first electrical interface at the first end of the bi-directional data cable being exposable for connection therewith.

13. An eye safety mechanism capable of being communicatively coupled to a first electrical interface at a first end of a bi-directional data cable having a receive channel and a transmit channel and having an electrical interface at both ends, the bi-irectional data cable having a bi-directional optical channel incorporated therein including an optical receive channel and an optical transmit channel, wherein the eye safety mechanism is configured to perform the following after the bi-directional data cable is connected to a host computing system:

an act of determining whether or not a loss of signal condition is present on the optical receive channel of the bi-directional data cable;

if the loss of signal is present, an act of intermittently disabling the optical transmit channel of the bi-directional data cable; and if the loss of signal is not present, an act of enabling the optical transmit channel over the bi-directional data cable without intermittently disabling transmission at least for most of the time until the next time a loss of signal is detected on the second optical fiber, wherein the bi-directional optical channel, including the optical receive channel and the optical transmit channel, is integrated within a cable protective housing of the bi-directional data cable with the first electrical interface at the first end of the bi-directional data cable being exposable for connection therewith.

14. The eye safety mechanism in accordance with claim 13, wherein the act of intermittently disabling the optical transmit channel comprises:

an act of operating an optical transmitter of the optical transmit channel such that it is off more than it is on.

15. The eye safety mechanism in accordance with claim 14, wherein the act of enabling the optical transmit channel comprises:

an act of operating the optical transmitter such that it is on more than it is off during the entire period of time until the next time a loss of signal is detected on the second optical fiber.

16. The eye safety mechanism in accordance with claim 14, wherein the act of enabling the optical transmit channel comprises:

an act of operating the optical transmitter such that it is on during the entire period of time until the next time a loss of signal is detected on the second optical fiber.

17. The eye safety mechanism in accordance with claim 13, wherein the act of intermittently disabling the optical transmit channel comprises:

an act of operating am optical transmitter of the optical transmit channel such that it is on less than twenty percent of the time until the loss of signal is no longer detected.

18. The eye safety mechanism in accordance with claim 17, wherein the act of enabling the optical transmit channel comprises:

an act of operating the optical transmitter such that it is on more than it is off during the entire period of time until the next time a loss of signal is detected on the second optical fiber.

19. The eye safety mechanism in accordance with claim 17, wherein the act of enabling the optical transmit channel comprises:
- an act of operating the optical transmitter such that it is on during the entire period of time until the next time a loss of signal is detected on the second optical fiber.

20. The eye safety mechanism in accordance with claim 19, wherein the eye safety mechanism is incorporated as part of a host computing system.

* * * * *